(12) United States Patent
Burström et al.

(10) Patent No.: US 8,457,062 B2
(45) Date of Patent: Jun. 4, 2013

(54) UPLINK POWER CONTROL IN A TDD COMMUNICATION SYSTEM

(75) Inventors: Per Burström, Luleå (SE); Anders Furuskär, Stockholm (SE); David Astely, Bromma (SE); Arne Simonsson, Gammelstad (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 392 days.

(21) Appl. No.: 12/934,812

(22) PCT Filed: Sep. 15, 2008

(86) PCT No.: PCT/SE2008/051029
§ 371 (c)(1),
(2), (4) Date: Dec. 6, 2010

(87) PCT Pub. No.: WO2009/120126
PCT Pub. Date: Oct. 1, 2009

(65) Prior Publication Data
US 2011/0075594 A1    Mar. 31, 2011

Related U.S. Application Data

(60) Provisional application No. 61/039,834, filed on Mar. 27, 2008.

(51) Int. Cl.
*H04L 5/22* (2006.01)
(52) U.S. Cl.
USPC .......................... 370/330; 370/280; 370/478

(58) Field of Classification Search
None
See application file for complete search history.

(56) References Cited

U.S. PATENT DOCUMENTS

2007/0275761 A1* 11/2007 Jin et al. ..................... 455/562.1
2009/0197632 A1* 8/2009 Ghosh et al. ................. 455/522

OTHER PUBLICATIONS

Nokia Siemens Networks &Nokia: "Fast open loop power control for PUCCH in TDD mode" 3GPP Draft; R1-080337, 3RD Generation Partnership Project (3GPP), Mobile Competence Centre; 650, Route Des Lucioles; F-06921 Sophia-Antipolis Cedex France, vol. tsg_ran\WG1 RL1\TSGR1_51b\Docs, no. Sevilla, Spain; 20080114, Jan. 8, 2008, XP050108856.

* cited by examiner

*Primary Examiner* — Jianye Wu

(57) ABSTRACT

A method performed in a wireless network includes receiving signals within a downlink frequency domain to enable channel estimation and measuring two or more signals only for two or more frequency bands of the downlink frequency domain that correspond to two or more uplink frequency bands associated with a scheduling grant or channel allocation that correspond to physical uplink channel frequency bands. The method also includes calculating path loss values for each of the frequency bands and calculating a total power based on the path loss values corresponding to the frequency bands. The method further includes determining a power allocation per frequency band based on the calculated total power to be applied to an uplink transmission and allocating the total power.

18 Claims, 8 Drawing Sheets

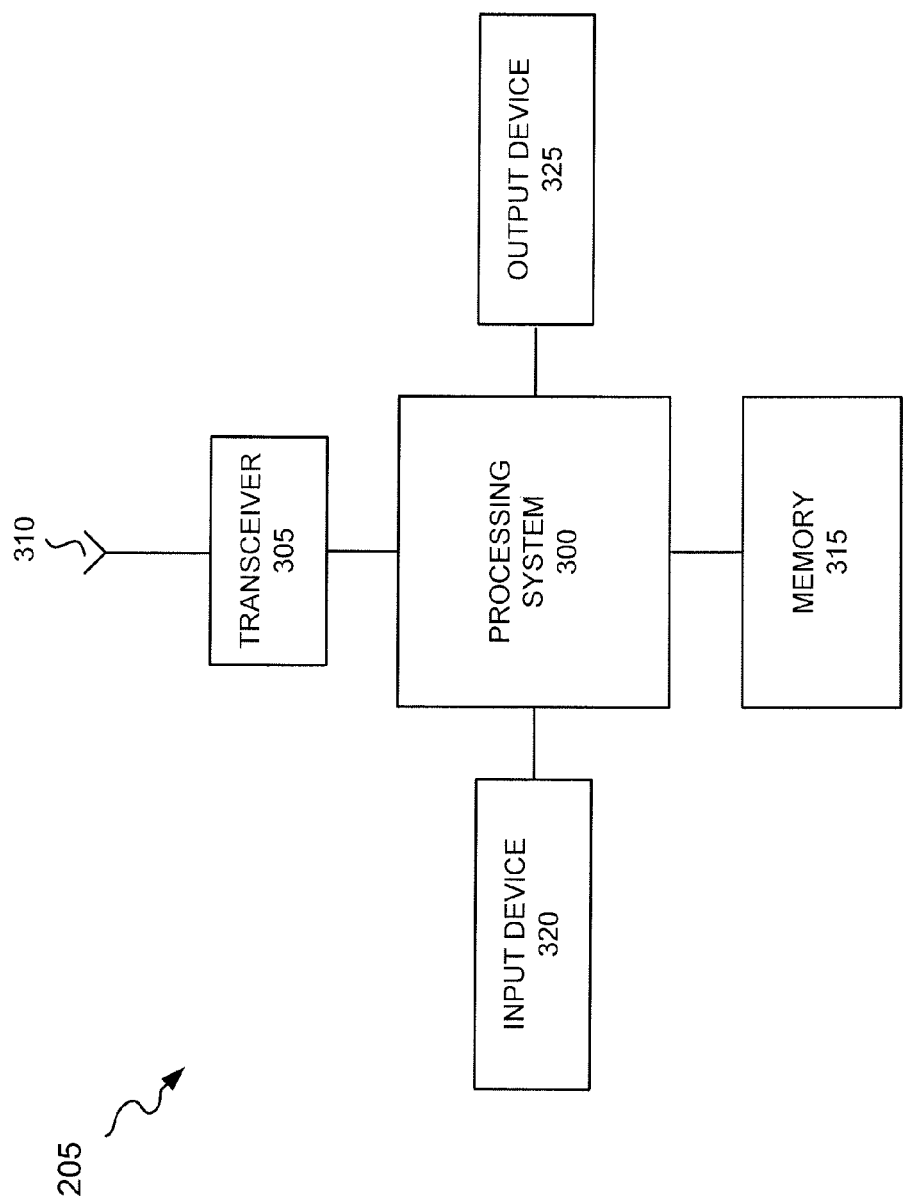

UPLINK POWER CONTROL IN A TDD COMMUNICATION SYSTEM

This application claims the benefit of U.S. Provisional Application No. 61/039,834, filed Mar. 27, 2008, the disclosure of which is fully incorporated herein by reference.

TECHNICAL FIELD

Implementations described herein relate generally to communication systems. More particularly, implementations described herein relate to a power control scheme in a time division duplex (TDD) communication system.

BACKGROUND

In a communication system, such as a wireless communication system, devices communicate with one another while managing various parameters associated with a communication link. For example, a wireless station and user equipment (UE) may communicate with one another while managing various parameters, such as power control, that are associated with a communication link. With respect to TDD communication systems, the same frequency band may be used in both uplink and downlink such that channel reciprocity exists. In this regard, the requirement of providing continuous feedback of channel estimates may be unnecessary.

Long Term Evolution (LTE) is one of many communication platforms that support TDD. In LTE, the physical uplink control channel (PUCCH) is part of band edges in a frequency spectrum. For example, in a 10 MHz frequency spectrum, only the two outer resource blocks (e.g., 180 kHz frequency bands) are allocated to the PUCCH. One PUCCH message (e.g., ACK/NACK or channel quality indicator (CQI)) may be sent in one slot on one of the resource blocks and then a frequency hop may be made to the other frequency band to the second slot.

With respect to the PUCCH, power control consists of a closed loop around an open loop point of operation according to the following expression:

$$P_{PUCCH}(i) = \min\{P_{MAX}, P_{O\_PUCCH} PL + \Delta_{F\_PUCCH}(F) + g(i)\}[dBm] \quad \text{Eq. 1,}$$

where $P_{PUCCH}$ is the total power, $P_{MAX}$ is the maximum allowed power that depends on the UE power class, $P_{O\_PUCCH}$ is a parameter composed of the sum of a 5-bit cell specific parameter $P_{O\_NOMINAL\_PUCCH}$ provided by higher layers with 1 db resolution in the range of [−127, −96] dBm and a UE specific component $P_{O\_UE\_PUCCH}$ configured by Radio Resource Control (RRC) in the range of [−8, 7] dB with 1 dB resolution, PL is the downlink path loss estimate calculated in the UE, $\Delta_{F\_PUCCH}(F)$ corresponds to table entries for each PUCCH transport format (TF) given by the RRC (i.e., an offset for the modulation and coding scheme employed), and g(i) corresponds the current PUCCH power control adjustment. A more detailed description may be found in 3GPP "E-UTRA Physical layer procedures," TS 36.213 V8.1.0.

The path loss (PL) in Equation 1 is based on the measured path gain of downlink reference symbols. This measurement is typically done over the entire downlink frequency spectrum and is time-filtered, resulting in a slow-fading, frequency averaged gain of which the power control is based.

In 3GPP RAN1 contribution R1-080337, entitled "Fast open loop power control for PUCCH in TDD mode," Nokia Siemens Networks & Nokia, it is suggested to utilize the channel reciprocity in TDD-mode where the same frequency band is used in the downlink and the uplink. The open loop shall then be faster to follow multipath fading. It is also suggested that the open loop only be based on measurements on the PUCCH frequencies.

The Physical Uplink Shared Channel (PUSCH) in LTE is power controlled in a similar way as PUCCH, as described in 3GPP "E-UTRA Physical layer procedures," TS 36.213 V8.1.0, with the same path loss based open loop, according to the following expression:

$$P_{PUSCH}(i) = \min\{P_{MAX}, 10\log_{10}(M_{PUSCH}(i)) + P_{O\_PUSCH}(j) + \alpha PL + \Delta_{TF}(i) + f(i)\}[dBm] \quad \text{Eq. 2,}$$

where $P_{PUCCH}$ is the total power, $P_{MAX}$ is the maximum allowed power that depends on the UE power class, $M_{PUSCH}(i)$ is the size of the PUSCH resource assignment expressed in number of resource blocks valid for subframe i, $P_{O\_PUSCH}(j)$ is a parameter composed of the sum of a 8-bit cell specific nominal component $P_{O\_NOMINAL\_PUSCH(J)}$ signaled from higher layers for j=−0 and 1 in the range of [−126, 24] dBm with 1 dB resolution and a 4-bit UE specific component $P_{O\_UE\_PUSCH(J)}$ configured by RRC for j=0 and 1 in the range of [−8, 7] dB with 1 dB resolution, and where the pathloss (PL) is the same wideband downlink pilot measure as for PUCCH. The PUSCH may be transmitted on almost the whole band except the band edges where PUCCH is allocated. However, a UE will often be scheduled on only a fraction of the total band allocated to the PUSCH.

Slow fading gain is only an average value calculated over many frequencies. Therefore, when basing the power output on slow fading gain, this can lead to a coarse power control, as well as slow changes to power output. Additionally, in a closed loop scheme (e.g., UE transmits and a base station measures signal-to-noise and transmits back power commands), there exists a delay (e.g., several milliseconds), which in many cases makes it impossible to follow fast fading. In this regard, if the fast open loop power control is based on wideband power, the fast fading will, for most channels, not be captured. FIG. 1 is a diagram illustrating TDD open loop ACK/NACK error rates. As illustrated, if the fast fading can be capture there is a gain (a lower ACK/NACK error rate) compared to a reference case in an open loop power control scheme based on downlink wideband path loss measurements. In an open loop power control scheme, the UE may, for example, perform measurements on the downlink, determine the fading environment, and manage its power output. For example, the UE may manage its output power so that it reaches a certain signal-to-noise ratio. These simulations results provide results for both slow fading and fast fading.

In the case of power control in a LTE communication system, even if the open loop power control is set based on PUCCH channel bands, the difference between fast fading loss on the two PUCCH resource blocks can be large (e.g., 10 dB or more in case of 10 MHz bandwidths). Thus, one measure for both slots may not be desirable. In this regard, to set a common power for both slots that performs well for both ACK/NACK and channel quality indicators (CQIs) can be difficult.

SUMMARY

It is an object to obviate at least some of the above disadvantages and to improve the operability of devices within a communication system.

According to one aspect, a method performed in a wireless network by a device that is communicatively coupled to another device, where channel reciprocity exists, may be characterized by receiving signals within a downlink frequency domain to enable channel estimation, measuring two or more signals only for two or more frequency bands of the downlink frequency domain that correspond to two or more uplink frequency bands associated with a scheduling grant for the device or two or more uplink frequency bands associated with a channel allocation, estimating path losses based on the measured two or more signals, calculating a total power based on the estimated path losses, and determining a power allocation based on the calculated total power to be applied to an uplink transmission.

According to another aspect, a device capable of operating in a time division duplex wireless environment may be characterized by one or more antennas and a processing system to select two or more frequency bands of a downlink frequency domain associated with a received downlink transmission that correspond to two or more frequency bands to be utilized for a subsequent transmission by the device, measure the two or more frequency bands of the downlink frequency domain, estimate path losses based on the measured two or more frequency bands, calculate an uplink power control value based on the estimated path losses, determine an uplink power allocation for the subsequent transmission based on the uplink power control value, and transmit the subsequent transmission according to the uplink power allocation.

A computer program may include instructions to receive a wireless transmission associated with a forward link, select two or more frequency bands of the wireless transmission that correspond to two or more frequency bands to be used for a wireless transmission in a reverse link, measure pilot or reference signals in the selected two or more frequency bands, estimate path losses based on the measured pilot or reference signals, calculate a total power control value for the reverse link based on the estimated path losses, and determine a power allocation for the two or more frequency bands to be used for the wireless transmission in the reverse link based on the total power control value.

BRIEF DESCRIPTION OF THE DRAWINGS

FIG. 3A is a diagram illustrating exemplary components of the User Equipment (UE) depicted in FIG. 2B;

DETAILED DESCRIPTION

The following detailed description refers to the accompanying drawings. The same reference numbers in different drawings may identify the same or similar elements. Also, the following description does not limit the invention.

Embodiments described herein may provide a power control scheme applicable to a TDD communication system. The power control scheme may measure path loss with respect to frequency bands to which the UE intends to transmit. For example, the frequency bands may correspond to scheduled frequency bands (e.g., an uplink data channel) or on an allocated channel (e.g., an uplink control and/or signaling channel). This is unlike existing techniques in which a path loss may be determined based on the entire (downlink) frequency spectrum. The path loss measurements may also include path loss measurements corresponding to individual frequency bands. The individual path loss measurements may be utilized for power allocation. Based on the power control scheme described herein, higher channel capacity in TDD mode, improved signaling (e.g., lower bit error rate), as well as other advantages that necessarily flow therefrom, may be realized. For example, in a LTE TDD system, the power control scheme may provide a higher PUCCH capacity in TDD mode for messages transmitted thereon (e.g., ACK/NACK, CQIs, etc.), as well as a higher PUSCH capacity. Additionally, the power control scheme may provide for improved signaling, as well as other advantages that necessarily flow therefrom. For purposes of discussion, the concepts described herein will be described in relation to the LTE TDD system, however, it will be appreciated that these concepts have broader application and may be implemented in other communication systems (e.g., TDD communication systems, such as Worldwide Interoperability for Microwave Access (WiMAX) and Wireless Local Area Network (WLAN)).

Figure 1:
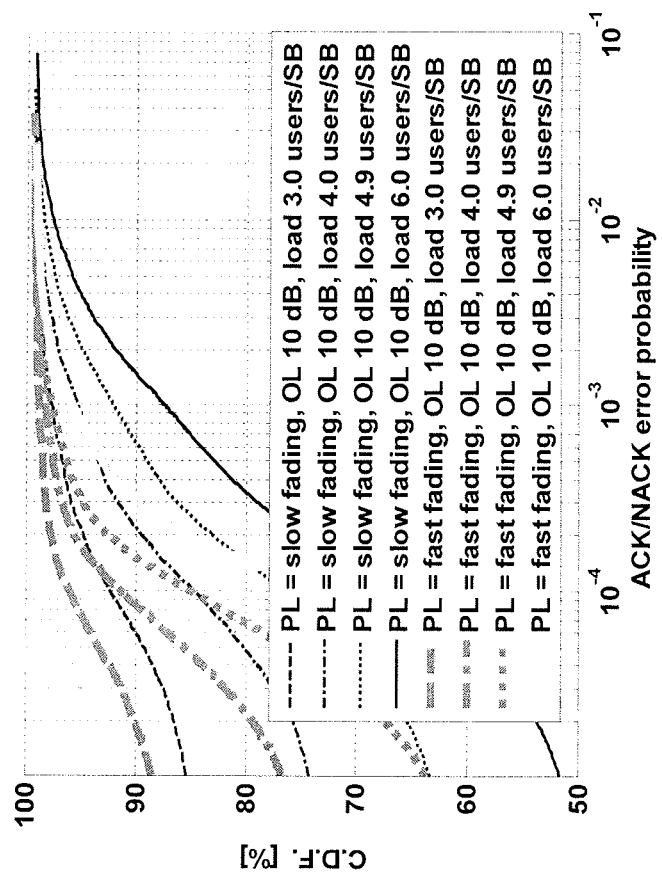
FIG. 1 is a diagram illustrating simulation results for slow fading versus fast fading compensation within an open loop power control scheme.
Figure 2A:
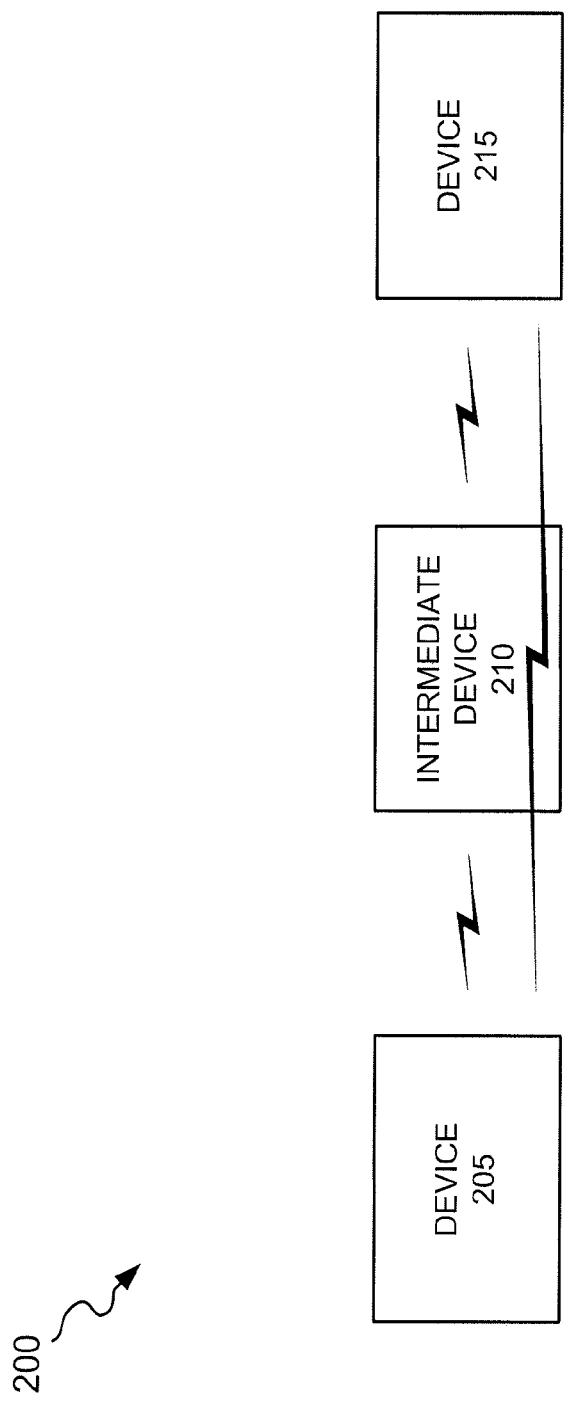
FIG. 2A is a diagram illustrating devices communicating with one another via an intermediate device.

FIG. 2A is a diagram illustrating an exemplary communication system 200 in which the concepts described herein may be implemented. As illustrated, communication system 200 may include a device 205, an intermediate device 210, and a device 215. A device may include, for example, a UE, a gateway, a base station, a relay, a repeater, a combination thereof, or another type of device (e.g., a satellite). The device may operate at layer 1, layer 2, and/or at a higher layer. As illustrated in FIG. 2A, the devices may be communicatively coupled. For example, the devices may be communicatively coupled via wireless communication links (e.g., radio, microwave, etc.). Communication system 200 may include a TDD communication system (e.g., a LTE TDD communication system) in which channel reciprocity exists.

Figure 2B:
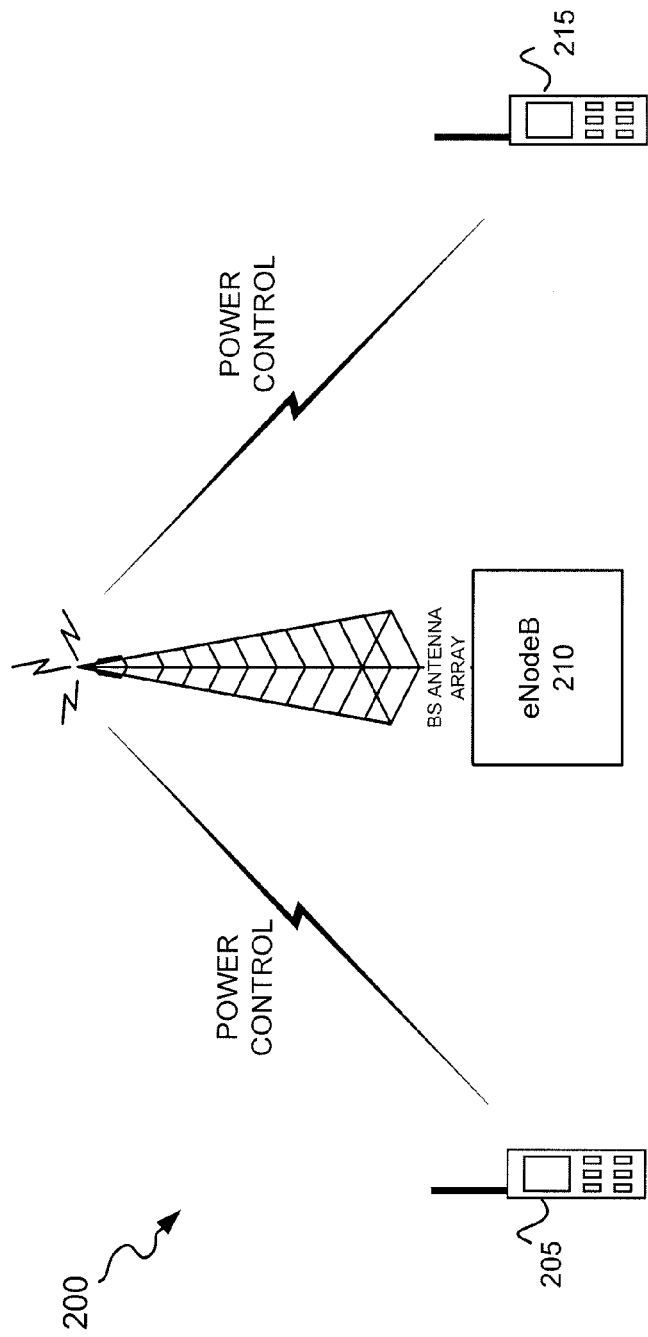
FIG. 2B is a diagram illustrating an exemplary implementation of the devices depicted in FIG. 2A.

Since the concepts described herein are applicable to a variety of devices in communication system 200, communication system 200 will be described based on the exemplary devices illustrated in FIG. 2B. FIG. 2B illustrates an exemplary implementation in which device 205 includes a UE, intermediate device 210 includes a base station (e.g., an enhanced Node B (eNodeB)), and device 215 includes a UE. FIG. 2B illustrates UE 205, eNodeB 210 and UE 215 as communicatively coupled to form a multi-hop network.

UE 205 and 215 may each include a device having communication capability. For example, a UE may include a telephone, a computer, a personal digital assistant (PDA), a gaming device, a music playing device, a video playing device, a web browser, a personal communication system (PCS) terminal, a pervasive computing device, and/or some other type of communication device.

ENodeB 210 may include a device having communication capability. ENode B 210 may operate in a LTE communication system (not illustrated). For example, the LTE communication system may include access gateways (AGWs) connected to various types of networks (e.g., Internet Protocol (IP) networks, etc). Among other things, power control may be implemented between the devices in communication system 200, as illustrated in FIG. 2B.

Although FIG. 2B illustrates an exemplary communication system 200, in other implementations, fewer, different, and/ or additional devices, arrangements, etc., may be utilized in accordance with the concepts described herein.

FIG. 3A is a diagram illustrating exemplary components of UE 205. UE 215 may be similarly configured. The term component is intended to be broadly interpreted to include, for example, hardware, software and hardware, firmware, software, a combination thereof, and/or some other type of component. As illustrated, UE 205 may include a processing system 300, transceiver 305, antenna 310, a memory 315, an input device 320, and an output device 325.

Processing system 300 may include a component capable of interpreting and/or executing instructions. For example, processing system 400 may include a general-purpose processor, a microprocessor, a data processor, a co-processor, a network processor, an application specific integrated circuit (ASIC), a controller, a programmable logic device, a chipset, and/or a field programmable gate array (FPGA). Processing system 300 may control one or more other components of UE 205. Processing system 300 may be capable of performing various communication-related processing (e.g., signal processing, channel estimation, power control, timing control, etc.), as well as other operations associated with the operation and use of UE 205.

Transceiver 305 may include a component capable of transmitting and/or receiving information over wireless channels via antennas 310. For example, transceiver 305 may include a transmitter and a receiver. Transceiver 305 may be capable of performing various communication-related processing (e.g., filtering, de/coding, de/modulation, signal measuring, etc.). Antenna 310 may include a component capable of receiving information and transmitting information via wireless channels. In one implementation, antenna 310 may include a multi-antenna system (e.g., a MIMO antenna system). Antenna 310 may provide one or more forms of diversity (e.g., spatial, pattern, or polarization).

Memory 315 may include a component capable of storing information (e.g., data and/or instructions). For example, memory 315 may include a random access memory (RAM), a dynamic random access memory (DRAM), a static random access memory (SRAM), a synchronous dynamic random access memory (SDRAM), a ferroelectric random access memory (FRAM), a read only memory (ROM), a programmable read only memory (PROM), an erasable programmable read only memory (EPROM), an electrically erasable programmable read only memory (EEPROM), and/or a flash memory.

Input device 320 may include a component capable of receiving an input from a user and/or another device. For example, input device 320 may include a keyboard, a keypad, a touchpad, a mouse, a button, a switch, a microphone, a display, and/or voice recognition logic.

Output device 325 may include a component capable of outputting information to a user and/or another device. For example, output device 325 may include a display, a speaker, one or more light emitting diodes (LEDs), a vibrator, and/or some other type of visual, auditory, and/or tactile output device.

Although FIG. 3A illustrates exemplary components of UE 205, in other implementations, UE 205 may include fewer, additional, and/or different components than those depicted in FIG. 3A. For example, UE 205 may include a hard disk or some other type of computer-readable medium along with a corresponding drive. The term "computer-readable medium," as used herein, is intended to be broadly interpreted to include, for example, a physical or a logical storing device. It will be appreciated that one or more components of UE 205 may be capable of performing one or more other tasks associated with one or more other components of UE 205.

Figure 3B:
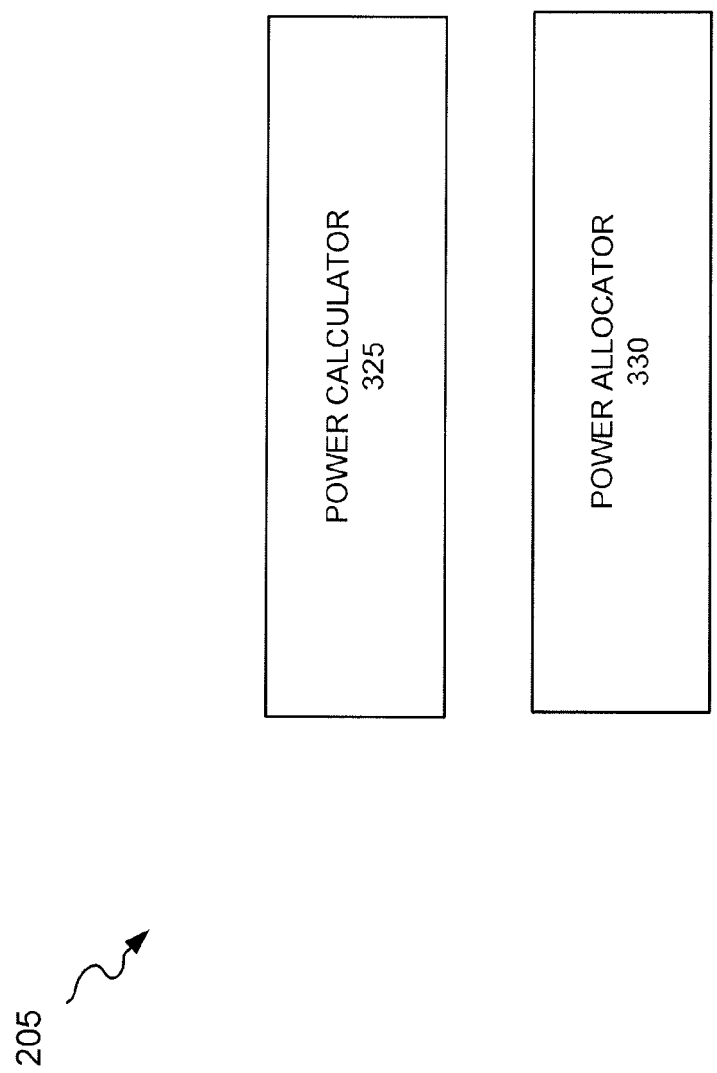
FIG. 3B is a diagram illustrating exemplary functional components of the UE that may calculate output power and perform power allocation.

FIG. 3B is a diagram illustrating exemplary functional components capable of performing one or more operations associated with the concepts described herein. In one embodiment the exemplary functional component may be implemented in processing system 300 of UE 205. However, it will be appreciated that this functional component may be implemented in connection with, for example, other components (e.g., transceiver 305) of UE 205, in combination with two or more components (e.g., processing system 300, transceiver 305, memory 315) of UE 205, and/or as an additional component(s) to those previously described in FIG. 3A. As illustrated, the functional components may include a power calculator 325 and a power allocator 330.

Power calculator 325 may include a component capable of determining one or more power values and/or power-related values in accordance with the power scheme described herein. For example, power calculator 325 may determine one or more power values that may influence the output power of a transmission by UE 205. As will be described in greater detail below, power calculator 325 may determine a power value based on path loss estimates corresponding to frequency bands in which UE 205 intends to transmit. The path loss estimates may include individual path loss estimates that correspond to individual frequency bands.

Power allocator 330 may include a component capable of assigning power output to a transmission based on the power values and/or power-related values determined by power calculator 325. For example, power allocator 330 may assign power values to addressable units (e.g., resource blocks, och carrier frequencies) of a transmission. Power allocator 330 may allocate output power based on the individual path loss estimates.

Although FIG. 3B illustrates exemplary functional components, in other implementations, UE 205 may include fewer, additional, and/or different functional components than those depicted in FIG. 3B. It will be appreciated that one or more functional components of UE 205 may be capable of performing one or more other tasks associated with one or more other functional components of UE 205.

Figure 3C:
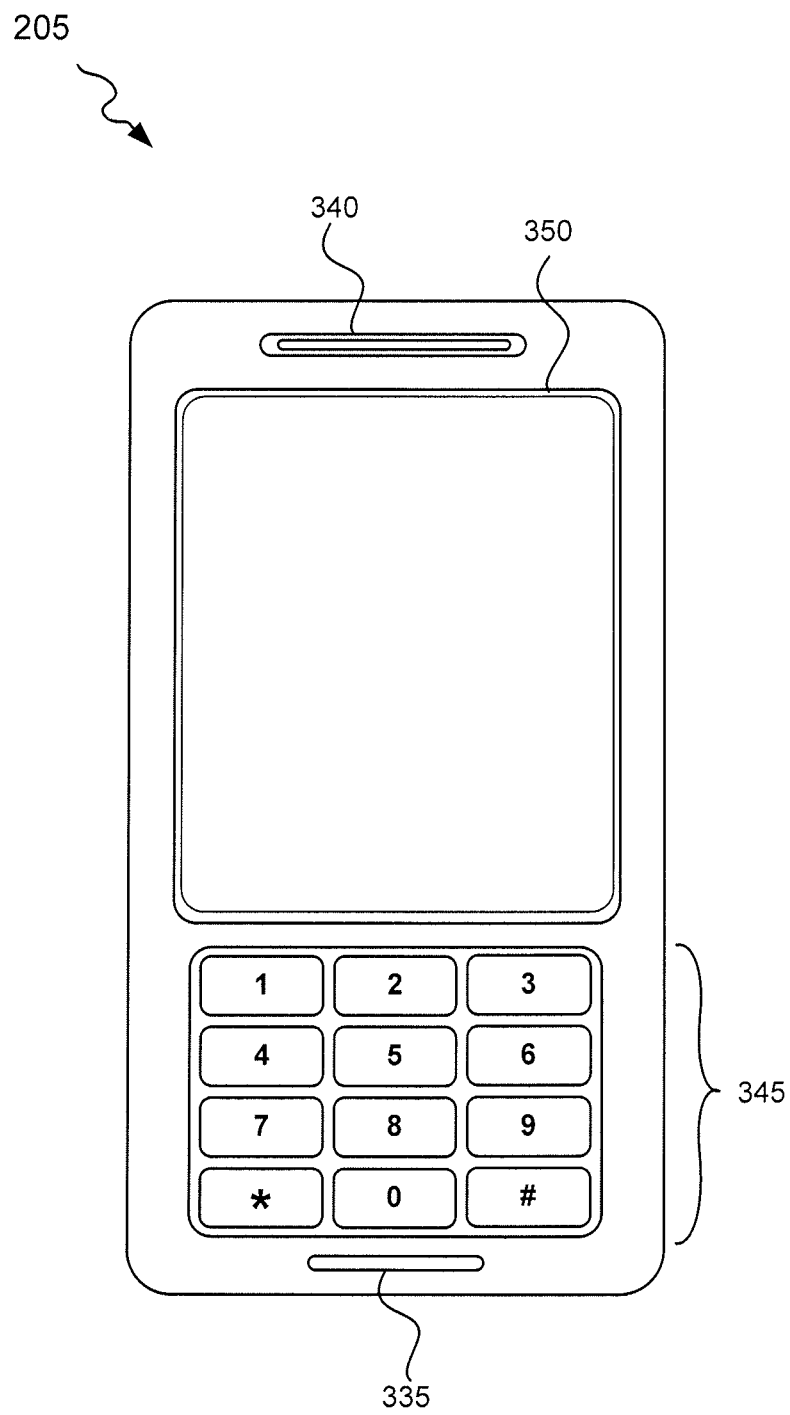
FIG. 3C is a diagram illustrating an exemplary implementation of the UE that includes a wireless telephone.

FIG. 3C is a diagram illustrating an exemplary implementation of UE 205, where UE 205 includes a wireless telephone. As illustrated, UE 205 may include a microphone 335 (e.g., of input device 320) for entering audio information, a speaker 340 (e.g., of output device 325) for outputting audio information, a keypad 345 (e.g., of input device 320) for entering information or selecting functions, and a display 350 (e.g., of input device 320 and/or output device 325) for outputting visual information and/or inputting information, selecting functions, etc.

Although FIG. 3C illustrates an exemplary implementation of UE 205, in other implementations, UE 205 may include fewer, additional, or different exemplary components than those depicted in FIG. 3C.

An exemplary process is described below, in connection with FIG. 4, in which UE 205 may perform a power control scheme. For purposes of discussion, the exemplary process will be described based on communication system 200 depicted in FIG. 2B. However, it will be appreciated that the exemplary process may be performed in communication system 200 depicted in FIG. 2A, in which different devices may be present.

Figure 4:
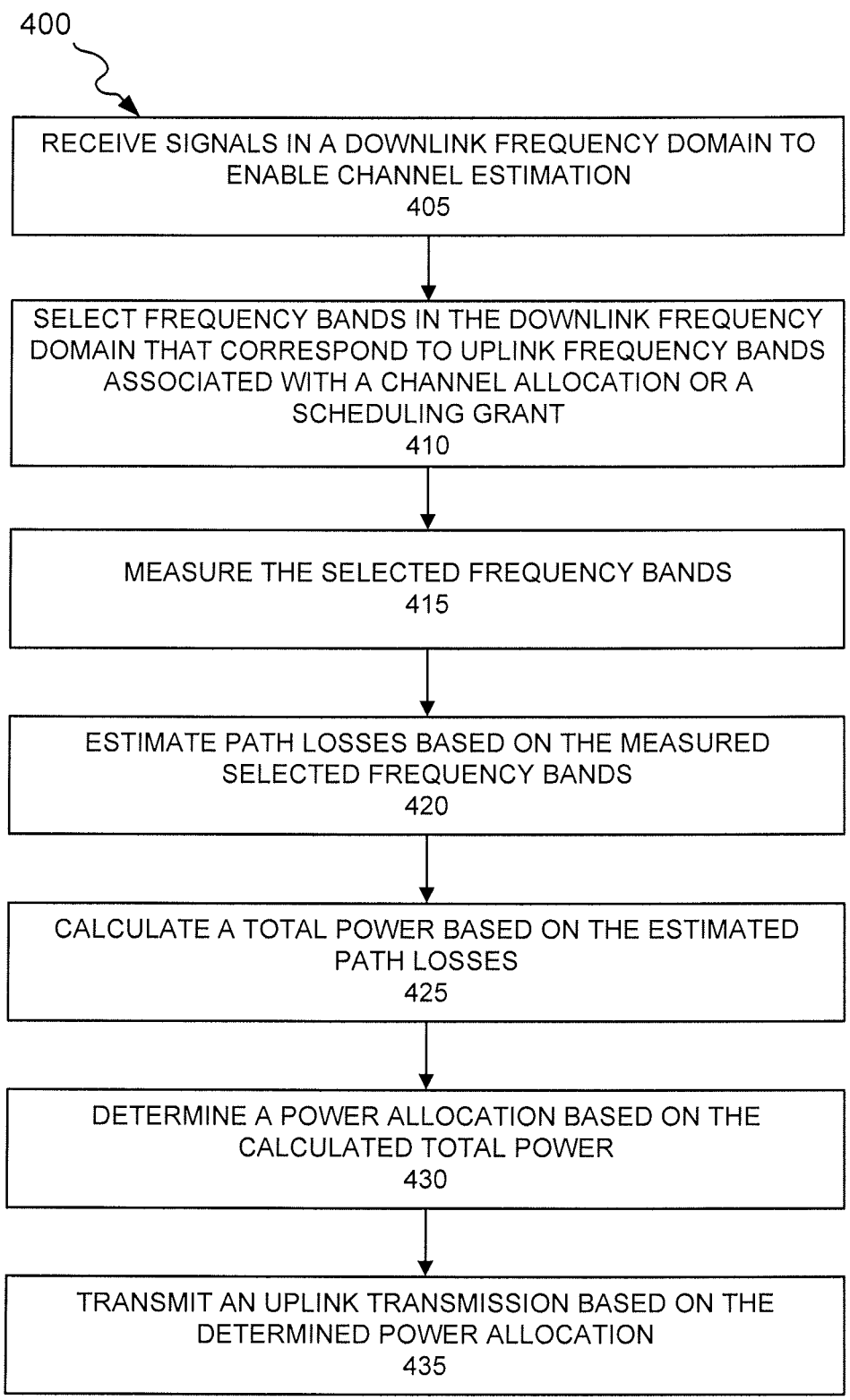
FIG. 4 is a flow diagram related to an exemplary process for calculating and allocating power consistent with concepts describe herein.

FIG. 4 is a flow diagram illustrating an exemplary process 400 for calculating and allocating power. The exemplary process 400 of FIG. 4 may be performed by UE 205 for controlling power with respect to a transmission. In addition to FIG. 4, process 400 will be described in connection with previous figures, as well as FIG. 5.

Figure 5:
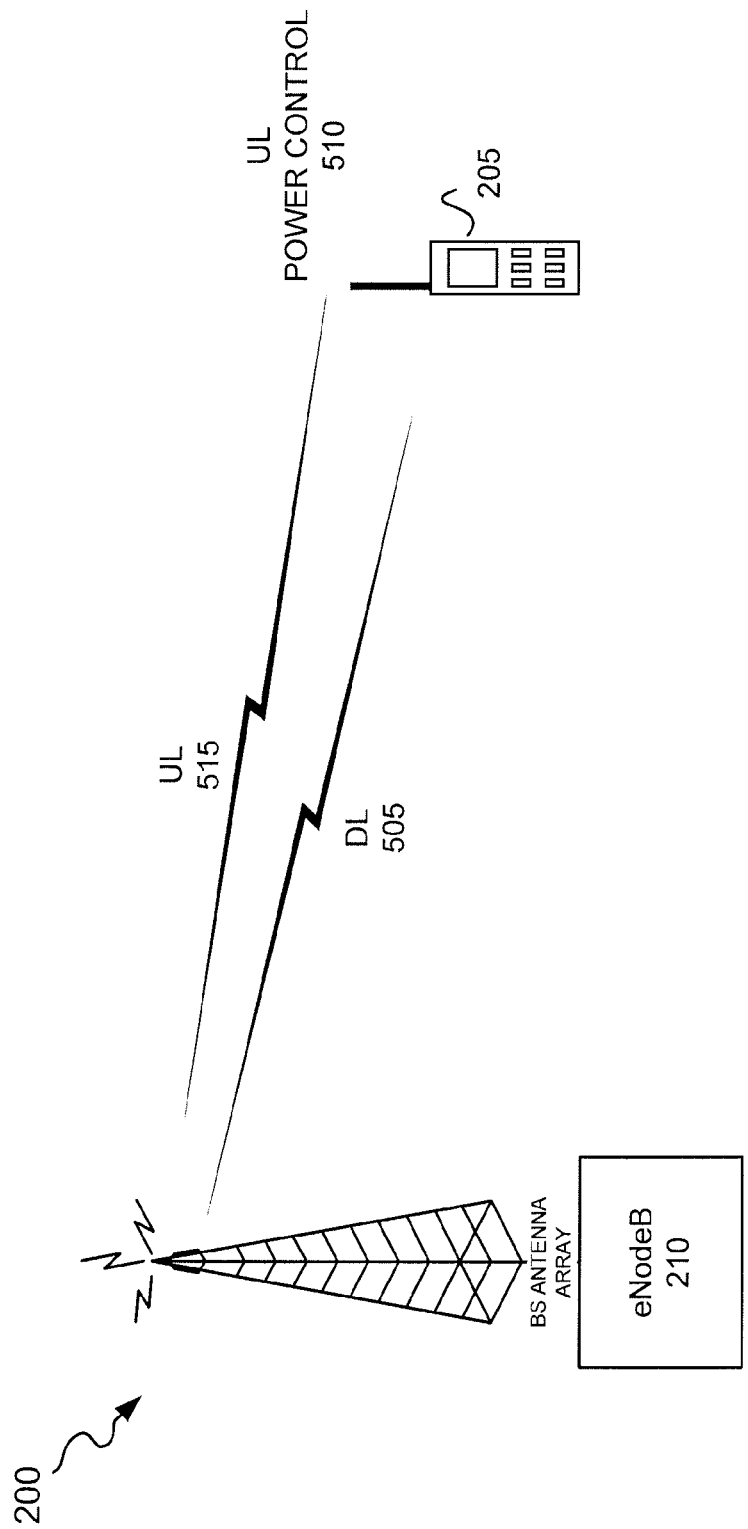
FIG. 5 is a diagram illustrating an exemplary scenario in which the process described herein may be implemented.

Process 400 may begin with receiving signals in a downlink frequency domain to enable channel estimation (block 405). For example, as illustrated in FIG. 5, eNodeB 210 may transmit a downlink signal 505. The received signal may include, for example, a pilot signal or some other reference signal.

Frequency bands in the downlink frequency domain that correspond to uplink frequency bands associated with a channel allocation or a scheduling grant may be selected (block 410). For example, transceiver 305 may select the frequency bands in downlink signal 505 that correspond to uplink frequency bands associated with the PUCCH or the PUSCH. The frequency bands selected may correspond to the frequency bands in which UE 205 intends to transmit based on its uplink power control 510. For example, with respect to the PUCCH, the frequency bands may correspond to the outer frequency bands in a uplink frequency spectrum. With respect to the PUSCH, the frequency bands may correspond to the frequency bands (e.g., resource blocks) in which UE 205 received a scheduled grant in the uplink frequency spectrum. In LTE Advanced (the evolution of LTE) where several carrier frequencies can be aggregated (scheduled to and transmitted on from the same UE) the frequency band may correspond to carrier frequencies.

The selected frequency bands may be measured (block 415). For example, transceiver 305 may perform channel measurements on the selected frequency bands. The channel measurements may include fast fading even tough this is typically (according to LTE standard) filtered away. Further, if the measurements are performed expediently, such measurements may well match the expected channel of the upcoming PUCCH transmission or PUSCH transmission in TDD. With respect to the PUCCH, for example, downlink pilots in the two corresponding PUCCH frequency bands (typically 180 kHz on the bandwidth edges) may be measured. With respect to the PUSCH, for example, all PUSCH resource blocks may be measured individually. With respect to aggregated carriers in LTE Advanced the carrier frequencies may be measured individually and also the PUSCH resource blocks within each carrier frequency.

Path losses based on the measured selected frequency bands may be estimated (block 420). For example, power calculator 325 of UE 205 may estimate path losses (PL) based on the pilots in the frequency bands in which UE 205 intends to transmit. For example, with respect to the PUCCH, power calculator 325 may estimate a path loss value (PL) based on the PUCCH measurements. Additionally, power calculator 325 may estimate two individual path loss values, $PL_1, PL_2$, corresponding to both slots. With respect to the PUSCH, a path loss value (PL) may be estimated by power calculator 325 based on the PUSCH measurements. In one implementation, power calculator 325 may estimate individual path loss values, $PL_1, PL_2, \ldots, PL_x$ based on the PUSCH measurements. In another implementation, power calculator 325 may not estimate individual path loss values for the PUSCH.

A total power based on the estimated path losses may be calculated (block 425). For example, power calculator 325 may calculate a total power based on equations 1 and 2, as previously described above. It will be appreciated that, in contradistinction to existing implementations, the path loss value (PL) relates to a path loss corresponding to frequency bands on which UE 205 intends to transmit versus the entire downlink frequency spectrum. With respect to PUCCH, power calculator 325 may also calculate an average power budget for both slots (e.g., $P_{PUCCH\_AVG}$), where $P_{PUCCH\_AVG}$ may expressed by the following expression:

$$P_{PUCCH\_AVG} = (P_{PUCCH1} + P_{PUCCH2})/2 \qquad \text{Eq. 3}$$

where $P_{PUCCH1}$ and $P_{PUCCH2}$ correspond to power values for the two PUCCH slots. This principle may be applicable to the PUSCH also. For example, power calculator 325 may calculate an average power budget with respect to the resource blocks in the PUSCH. In such instances, individual power values may be estimated. For example, the power values $P_{PUCCH1}$ and $P_{PUCCH2}$ may be calculated according to the standard formula Eq.1 using individual PL values.

A power allocation based on the calculated total power may be determined (block 430). With respect to the PUCCH, a number of different power allocation schemes associated with the slots may be implemented by power allocator 330 of UE 205. For example, the total power may be allocated on the two PUCCH slots based on the individual path losses, where $[P_{PUCCH1}, P_{PUCCH2}] = F(PL_1, PL_2, P_{PUCCH\_AVG})$, and the function F( ) may utilize individual path losses and/or an average power budget for power allocation. In one implementation, all of the power (e.g., $2*P_{PUCCH\_AVG}$) may be allocated to the best slot. The criterion for determining the best slot may be based on the slot that has the minimum path loss. In another implementation, all of the power may be allocated to the best slot if the absolute value of the difference in path losses, $PL_1, PL_2$, is larger than a specified threshold. In the event that the difference in path losses is less than the threshold, the total power may be distributed between both slots. The threshold may be any value (e.g., one to infinity). In still another implementation, all of the power may be allocated in a manner that provides that both PUCCH slots are received by eNodeB 210 at equal strength. For example, the power allocation of each slot may be determined based on the following expression:

$$\text{Set the power of slot } k \text{ to } p(k) = \text{signal-to-noise-target}*\text{measured noise}/PL_K \qquad \text{Eq. 3.}$$

In yet another implementation, allocation of power per slot p(k) may be distributed based on a water filling principle, which may be expressed according to the following expression:

$p(k) = \max(A - 1/PL_K, 0)$, with the constraint that sum(p(k)) is less than the maximum available output power. The variable A is a parameter that is used to tune the water filling algorithm.

It will be appreciated that the power allocation may be different for ACK/NACK and CQI transmissions. For example, for ACK/NACK transmissions, all of the power may be allocated to the slot that has the minimum path loss since the same information is transmitted on both slots. On the other hand, for example, for CQI transmissions, all of the power may be allocated in a manner that provides that both slots are received by eNodeB 210 at equal strength since different information may be transmitted in each slot.

With respect to the PUSCH, the total power may be allocated to the frequency bands associated with the uplink grant. For example, power allocator 330 may a power allocation scheme based on the schemes described for the PUCCH.

An uplink transmission based on the determined power allocation may be transmitted (block 435). For example, as illustrated in FIG. 5, UE 205 may transmit an uplink transmission 515 based on the determined power allocation.

As described, a device, such as UE 205, may employ a power scheme that includes calculating power values and/or power-related values based on path losses that correspond to frequency bands in which UE 205 intends to transmit. In the case of a LTE communication system, application of these concepts has been described in connection with the PUCCH and the PUSCH. The device, such as UE 205, may also manage power allocation based on individual path losses. Power allocation schemes may be tailored to the particular information being transmitted. For example, as previously described, different power allocation schemes may be used between ACK/NACK and CQI transmissions.

The foregoing description of implementations provides illustration, but is not intended to be exhaustive or to limit the implementations to the precise form disclosed. Modifications and variations are possible in light of the above teachings or may be acquired from practice of the teachings. For example, the individual path losses may be incorporated into equations 1 and/or 2. The closed loop parameters may be the same for both PUCCH slots or individually controlled for each PUCCH slot. These principles may equally apply for the PUSCH. Additionally, it will be appreciated that the concepts described herein may be applied to communication systems, other than LTE. For example, the concepts described may be applied to WiMAX, such as, for example sub-channel scheduling on the Partial Usage of Subchannels (PUSC), and to WiMAX carrier frequencies.

In addition, while a series of blocks has been described with regard to the process illustrated in FIG. 4, the order of the blocks may be modified in other implementations. Further, non-dependent blocks may be performed in parallel. Further one or more blocks may be omitted. It will be appreciated that one or more of the processes described herein may be implemented as a computer program. The computer program may be stored on a computer-readable medium or represented in some other type of medium (e.g., a transmission medium).

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

Even though particular combinations of features are recited in the claims and/or disclosed in the specification, these combinations are not intended to limit the invention. In fact, many of these features may be combined in ways not specifically recited in the claims and/or disclosed in the specification.

It should be emphasized that the term "comprises" or "comprising" when used in the specification is taken to specify the presence of stated features, integers, steps, or components but does not preclude the presence or addition of one or more other features, integers, steps, components, or groups thereof.

No element, act, or instruction used in the present application should be construed as critical or essential to the implementations described herein unless explicitly described as such.

The term "may" is used throughout this application and is intended to be interpreted, for example, as "having the potential to," "configured to," or "capable of," and not in a mandatory sense (e.g., as "must"). The terms "a" and "an" are intended to be interpreted to include, for example, one or more items. Where only one item is intended, the term "one" or similar language is used. Further, the phrase "based on" is intended to be interpreted to mean, for example, "based, at least in part, on," unless explicitly stated otherwise. The term "and/or" is intended to be interpreted to include any and all combinations of one or more of the associated list items.

What is claimed is:

1. A method performed in a wireless network by a device that is communicatively coupled to another device, and where channel reciprocity exists, the method comprising:
   receiving signals within a downlink frequency domain to enable channel estimation;
   measuring two or more of the signals only for two or more frequency bands of the downlink frequency domain that correspond to two or more uplink frequency bands associated with a scheduling grant for the device or two or more uplink frequency bands associated with a channel allocation that correspond to physical uplink control channel or physical uplink shared channel frequency bands;
   estimating path losses based on the measured two or more signals by calculating path loss values for each of the frequency bands;
   calculating a total power based on the path loss values corresponding to the frequency bands;
   determining a power allocation per frequency band based on the calculated total power to be applied to an uplink transmission; and
   allocating the total power according to one of:
   a) selecting one of the frequency bands having a minimum calculated path loss value, and allocating the total power to the selected one of the frequency bands;
   (b) selecting one of the frequency bands having a minimum calculated path loss value, and allocating the total power to the selected one of the frequency bands if a difference in the calculated path loss values between the selected one of the frequency bands and another of the frequency bands is larger than a threshold value, and allocating the total power between the frequency bands when the difference in the calculated path loss values is less than the threshold value;
   (c) allocating the total power between the frequency bands so that the other device receives the uplink transmission on the frequency bands in equal strength; and
   (d) allocating the total power between the frequency bands based on a water filling principle.

2. The method of claim 1, further comprising:
   calculating the total power value based on averaging together power values associated with the two or more frequency bands that correspond to each of physical uplink control channel (PUCCH)-frequency bands, and where the power allocation is based on the calculated average power value.

3. The method of claim 2, wherein the power allocation is based on the calculated path loss values.

4. The method of claim 1, where the measuring of two or more of the signals only for the two or more frequency bands of the downlink frequency domain that correspond to the two or more uplink frequency bands associated with the scheduling grant comprises: measuring the two or more frequency bands that correspond to each of uplink shared channel frequency bands, and where the estimating comprises: estimating the path losses based on the measured two or more frequency bands that correspond to each of the uplink shared channel frequency bands.

5. The method of claim 1, further comprising:
   selecting the two or more frequency bands of the downlink frequency domain that corresponds to the two or more uplink frequency bands associated with the scheduling grant or the channel allocation.

6. The method of claim 1, further comprising:
transmitting the uplink transmission on the two or more uplink frequency bands in accordance with the determined power allocation.

7. The method of claim 1, where the two or more frequency bands correspond to resource blocks within spectrum allocations.

8. The method of claim 1, where the two or more frequency bands correspond to carrier frequencies.

9. A device for operating in a time division duplex wireless environment comprising:
one or more antennas; and
a processing system operable to:
select two or more frequency bands of a downlink frequency domain associated with a received downlink transmission that correspond to two or more uplink frequency bands to be utilized for a subsequent transmission by the device,
measure the two or more frequency bands of the downlink frequency domain,
estimate path losses based on the measured two or more frequency bands,
calculate an uplink power control value based on the estimated path losses,
determine an uplink power allocation for the subsequent transmission based on the uplink power control value, and
transmit the subsequent transmission according to the uplink power allocation,
where, when measuring the two or more frequency bands of the downlink frequency domain, the processing system is configured to measure reference signals or pilot signals received in the two or more frequency bands,
where the processing system is further configured to:
calculate a path loss for each of the two or more frequency bands of the downlink frequency domain that correspond to physical uplink control channels or physical uplink shared channels, and
where determining the uplink power allocation per frequency band is based on the calculated path losses for each of the two or more frequency bands and
where, when determining the uplink power allocation for the frequency bands, the processing system is further configured to:
select one of the two or more frequency bands that has a minimum calculated path loss,
allocate a power corresponding to the uplink power control value to the selected frequency band that has the minimum calculated path loss if a difference in the calculated path losses, between the selected one of the two or more frequency bands and another of the two or more frequency bands, is larger than a threshold value, and
allocate a power corresponding to the uplink power control value between the two or more frequency bands when the difference in the calculated path losses is less than the threshold value.

10. The device of claim 9, where the device includes at least one of user equipment, a mobile station, a wireless telephone, a personal digital assistant, a web browsing device, or a subscriber station.

11. The device of claim 9, where the two or more uplink frequency bands include at least one of physical uplink control channels (PUCCHs) or physical uplink shared control channels (PUSCH).

12. The device of claim 9, where, when determining the uplink power allocation for physical uplink control channels (PUCCHs), the processing system is further configured to:
select one of the two or more frequency bands that has a minimum calculated path loss, and
allocate a power corresponding to the uplink power control value to the selected frequency band that has the minimum calculated path loss.

13. The device of claim 9, where, when determining the uplink power allocation for physical uplink control channels (PUCCHs), the processing system is further configured to:
allocate a power corresponding to the uplink power control value according to a water-filling principle.

14. The device of claim 9, where, when determining the uplink power allocation for physical uplink control channels (PUCCHs), the processing system is further configured to:
allocate a power corresponding to the uplink power control value so that a received signal strength of the uplink transmission that includes the two or more uplink frequency bands are equal.

15. The device of claim 9, where the two or more uplink frequency bands correspond to a physical uplink shared channel.

16. A non-transitory computer-readable medium encoded with instructions that are operable, when executed on a computer, to:
receive a wireless transmission associated with a forward link;
select two or more frequency bands of the wireless transmission that correspond to two or more frequency bands to be used for a wireless transmission in a reverse link that correspond to physical uplink control channel or physical uplink shared channel frequency bands;
measure pilot or reference signals in the selected two or more frequency bands;
estimate path losses based on the measured pilot or reference signals by calculating path loss values for each of the frequency bands;
calculate a total power control value for the reverse link based on the path loss values corresponding to the frequency bands;
determine a power allocation for the two or more frequency bands to be used for the wireless transmission in the reverse link based on the total power control value, and
allocate the total power according to one of:
a) selecting one of the frequency bands having a minimum calculated path loss value, and allocating the total power to the selected one of the frequency bands;
(b) selecting one of the frequency bands having a minimum calculated path loss value, and allocating the total power to the selected one of the frequency bands if a difference in the calculated path loss values between the selected one of the frequency bands and another of the frequency bands is larger than a threshold value, and allocating the total power between the frequency bands when the difference in the calculated path loss values is less than the threshold value;
(c) allocating the total power between the frequency bands so that the other device receives the uplink transmission on the frequency bands in equal strength; or
(d) allocating the total power between the frequency bands based on a water filling principle.

17. The non-transitory computer-readable medium of claim 16, where the two or more frequency bands to be used for the wireless transmission in the reverse link correspond to a reverse link control channel.

18. The non-transitory computer-readable medium of claim 16, where the wireless transmission associated with the forward link comprises a plurality of frequency bands within a frequency domain, where the plurality of frequency bands each includes pilot or reference signals, and the selected two or more frequency bands is a set that is less than the plurality of frequency bands.

* * * * *

UNITED STATES PATENT AND TRADEMARK OFFICE
CERTIFICATE OF CORRECTION

PATENT NO. : 8,457,062 B2
APPLICATION NO. : 12/934812
DATED : June 4, 2013
INVENTOR(S) : Burström et al.

It is certified that error appears in the above-identified patent and that said Letters Patent is hereby corrected as shown below:

In the Specification

In Column 7, Line 31, delete "tough" and insert -- though --, therefor.

Signed and Sealed this
Fifteenth Day of October, 2013

Teresa Stanek Rea
*Deputy Director of the United States Patent and Trademark Office*